United States Patent
Rackman

(10) Patent No.: US 6,323,961 B1
(45) Date of Patent: Nov. 27, 2001

(54) FACSIMILE MACHINE FOR PRINTING DOCUMENTS WITH SELECTIVELY ALIGNED EDGES

(76) Inventor: Michael I. Rackman, 1710 Glenwood Rd., Brooklyn, NY (US) 11230

( * ) Notice: Subject to any disclaimer, the term of this patent is extended or adjusted under 35 U.S.C. 154(b) by 0 days.

(21) Appl. No.: 08/144,293

(22) Filed: Oct. 27, 1993

Related U.S. Application Data

(63) Continuation-in-part of application No. 07/972,611, filed on Nov. 6, 1992, now Pat. No. 5,282,065.

(51) Int. Cl.[7] ................................................... H04N 1/04
(52) U.S. Cl. ................................................ 358/448; 358/403
(58) Field of Search ................................. 358/400, 488, 358/403, 401, 405

(56) References Cited

U.S. PATENT DOCUMENTS

| | | | |
|---|---|---|---|
| 4,169,275 | * 9/1979 | Gunning | 358/300 |
| 4,186,415 | 1/1980 | Takayama | 358/260 |
| 4,205,350 | * 5/1980 | Gunning | 358/296 |
| 4,225,888 | 9/1980 | Takayama et al. | 358/288 |
| 4,491,873 | 1/1985 | Takayama | 358/256 |
| 4,642,700 | 2/1987 | Ohta et al. | 358/285 |
| 4,710,951 | 12/1987 | Itezono | 379/100 |
| 4,747,149 | 5/1988 | Umeda et al. | 382/18 |
| 4,941,195 | 7/1990 | Tanaka et al. | 382/61 |
| 4,998,285 | 3/1991 | Suzuki et al. | 382/9 |
| 5,021,890 | 6/1991 | Yoshida et al. | 358/405 |
| 5,038,218 | * 8/1991 | Matsumoto | 358/488 |
| 5,073,954 | 12/1991 | Van Tyne et al. | 382/18 |
| 5,101,287 | 3/1992 | Akuzawa | 358/496 |
| 5,123,062 | 6/1992 | Sangu | 382/57 |
| 5,131,053 | 7/1992 | Bernzott et al. | 382/9 |
| 5,132,808 | 7/1992 | Higuchi et al. | 358/403 |
| 5,133,026 | 7/1992 | Fujiwara et al. | 382/61 |
| 5,142,161 | 8/1992 | Brackmann | 250/566 |
| 5,151,952 | 9/1992 | Canu et al. | 382/29 |
| 5,191,438 | 3/1993 | Katsurada et al. | 358/426 |
| 5,202,744 | * 4/1993 | Ishimitsu | 358/488 |
| 5,202,774 | 4/1993 | Ishimitsu | 358/488 |
| 5,303,335 | * 4/1994 | Iwasaki et al. | 395/111 |
| 5,438,436 | * 8/1995 | Harris | 358/500 |

* cited by examiner

Primary Examiner—Thomas D. Lee
Assistant Examiner—Stephen Brinich
(74) Attorney, Agent, or Firm—Gottlieb, Rackman & Reisman, P.C.

(57) ABSTRACT

A facsimile machine which allows the user to select whether all documents have their like edges aligned, or whether successive documents have alternate orientations. The machine determines the orientation of each received page. Reversing the order of the data allows a document orientation to be switched. Whether it is switched depends on the format selected by the user. The machine also includes a switch to print the received documents in one of three formats including top edges always first, bottom edges always first, or alternating documents such that a first has all of its pages aligned top edges first, the next has all of its pages aligned bottom edges first, etc.

6 Claims, 7 Drawing Sheets

FIG. 1
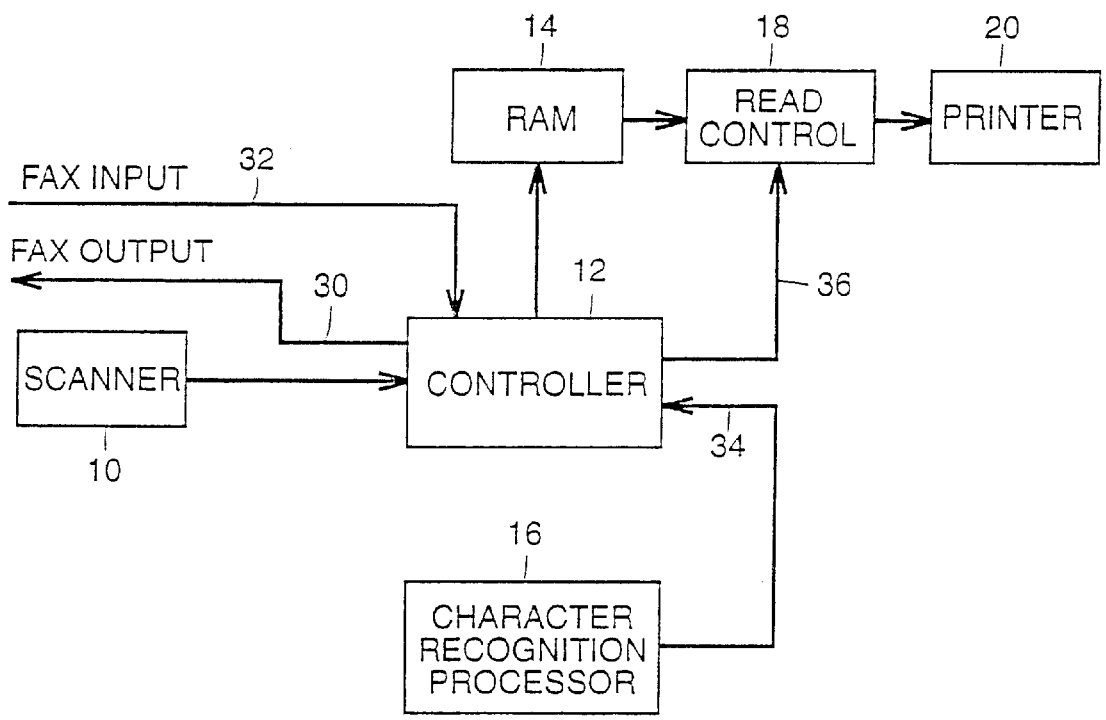
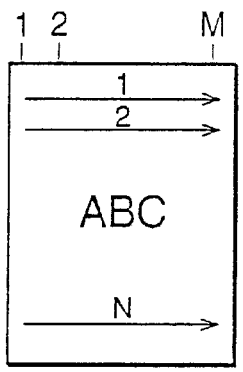
FIG. 2
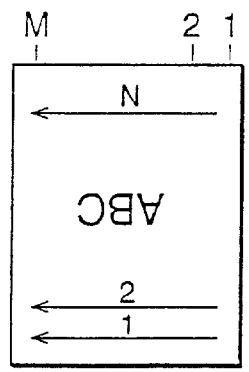
FIG. 3

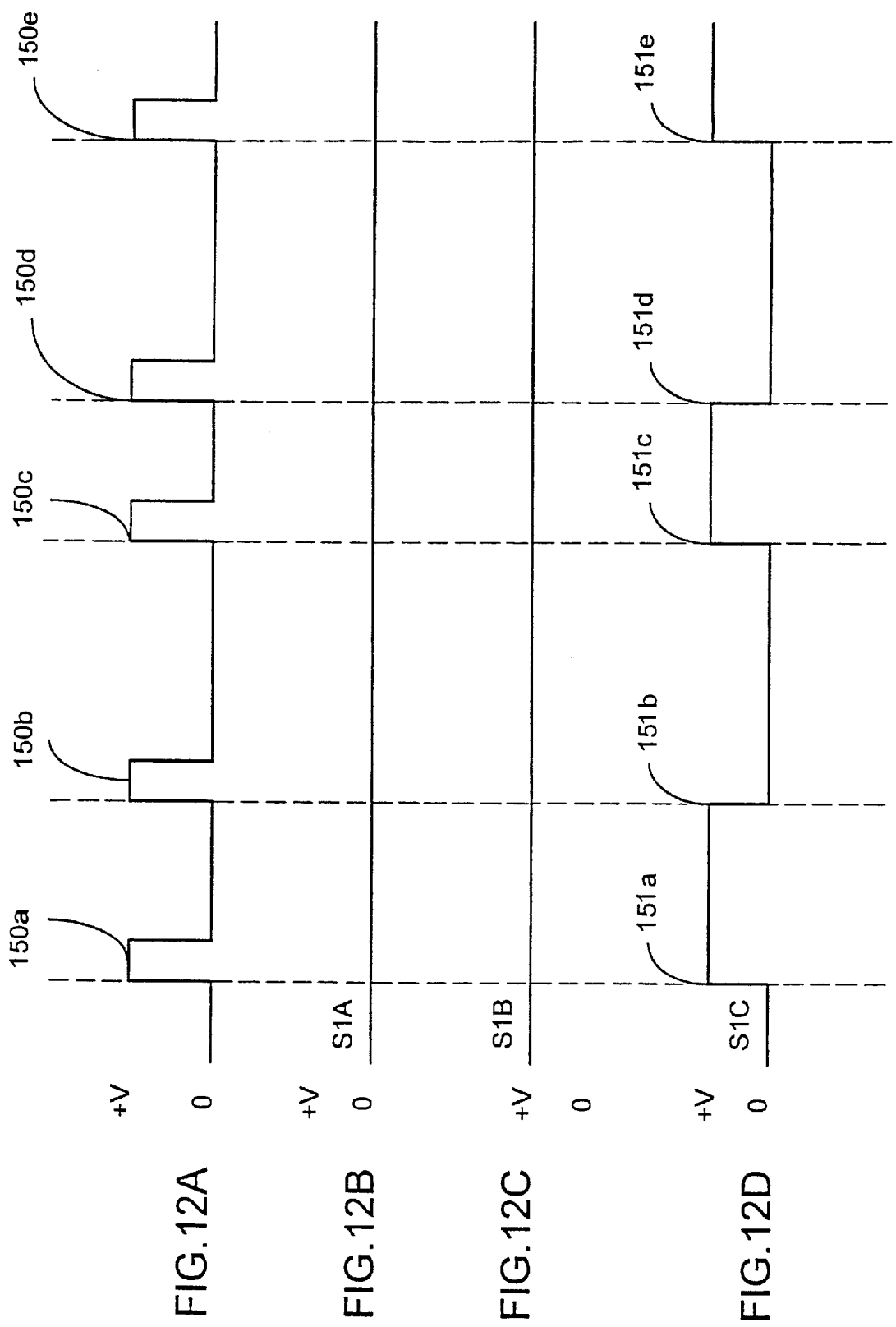

FACSIMILE MACHINE FOR PRINTING DOCUMENTS WITH SELECTIVELY ALIGNED EDGES

CROSS-REFERENCE TO RELATED APPLICATIONS

This is a continuation-in-part application based upon co-pending U.S. patent application Ser. No. 07/972,611 filed Nov. 6, 1992 now U.S Pat No. 5,282,065.

BACKGROUND OF THE INVENTION

This invention relates to facsimile machines for printing documents with ordered edges, and more particularly to a facsimile machine that selectively prints all documents with common edges aligned, or successive documents with alternating top edges first, then bottom edges first, etc. (Depending on the context, the word "document" refers to a single page or to all of the pages in a single document constituting the same fax transmission.)

Facsimile technology is highly developed, and facsimile machines enjoy widespread use. My previous invention U.S. patent application Ser. No. 07/972,611 filed Nov. 6, 1992 and application Ser. No. 08/111,544 filed on Aug. 25, 1993 by Peter Crosby now U.S. Pat. No. 5,311,607 are directed to solving what is a relatively mild annoyance. The problem has to do with the fact that when transmitting documents by facsimile, there is no uniformity among users in whether the top of a document is sent first as opposed to the bottom. While most people send the top first, many do not. At the receiving site, especially if a machine has been receiving transmissions all night, a person looking through a stack of received documents in the morning (for example, in an office where the first one in scans all of the received documents to see if there are any urgent matters) has to look at documents some of which are right side up and some of which are upside down, but with no organized pattern to the alignment of the pages. Accordingly, a fax machine having the ability to provide a user with documents all in one orientation (to facilitate a review), or in alternating orientations to distinguish between successive single-page or multi-page documents would be of benefit.

SUMMARY OF THE INVENTION

It is an object of my invention to provide a facsimile machine in which documents are oriented in accordance with a user's selection. For example, in my previous application I described a machine to print all documents the same way, i.e., with their corresponding edges aligned. This means that any documents which come in the "wrong" way are reoriented so that the corresponding edges of all documents are aligned—tops with tops, and bottoms with bottoms. This facilitates a quick scanning review. However, it may be desirable to have alternating documents, i.e., with corresponding edges alternating. This means having the first document (no matter how many pages) print top edge first, the second (no matter how many pages) print bottom edge first, the third (no matter how many pages) print top edge first, etc. In this way a person reviewing a stack of documents can quickly determine where one document ends and the next begins. Different people have different preferences.

The problem toward which the subject invention is directed is admittedly not a serious one, at least not serious enough to warrant a significant increase in the cost of a facsimile machine. It is therefore another object of my invention to accomplish the aforesaid reorientation at very low cost.

In accordance with the principles of my invention, document reorientation is controlled primarily through software, using known techniques (but for a totally different purpose), thus accomplishing the objective at an insignificant increased cost. Most facsimile machines are already equipped with sufficient memory to store data representative of a complete document. In my invention, the data representative of a received document is stored in memory. (The term "received document" is sometimes used herein to refer to data signals representative of the document.) Conventional image and character recognition software is then used for determining whether the document (i.e., data representing the document) came in top first or bottom first.

This is easily accomplished, for example, by using character recognition software to scan the document, as it is mapped in the memory, in two different ways—top down and left to right, and bottom up and right to left. One of the two scanning sequences will result in recognizable characters. (On the off chance that they both do, the one with more recognizable characters is the "winner.") The stored data is then read out of the memory and used to control the printer. If a document came in top edge first, then its data is read out in the same order if it is to be printed top edge first. If the document came in bottom edge first, then the data is read out in reverse order if the top edge is to be printed first. The reverse procedure causes a document to be printed bottom edge first.

The user operates a switch to select which way documents are to be printed. To print all documents with corresponding edges aligned, the switch causes sequencing as described in my co-pending application. To print successive documents with alternating orientations, the machine still determines the received orientation of every page but now causes them to be printed in alternating orientations.

Further objects, features and advantages of my invention will become apparent upon consideration of the following detailed description.

The invention comprises the features of construction, combination of elements and arrangement of parts which will be exemplified in the constructions hereinafter set forth, and the scope of the invention will be identified in the claims.

BRIEF DESCRIPTION OF THE DRAWINGS

For a fuller understanding of the invention, reference is made to the following description, taken in connection with the accompanying drawings, in which:

FIG. 1 depicts in block diagram form the illustrative embodiment of my invention;

FIG. 2 depicts a first scanning order;

FIG. 3 depicts a second scanning order;

FIGS. 12A–12D are timing diagrams illustrating the operation of the circuit of FIG. 11.

DETAILED DESCRIPTION OF THE PREFERRED EMBODIMENTS

Figure 4:
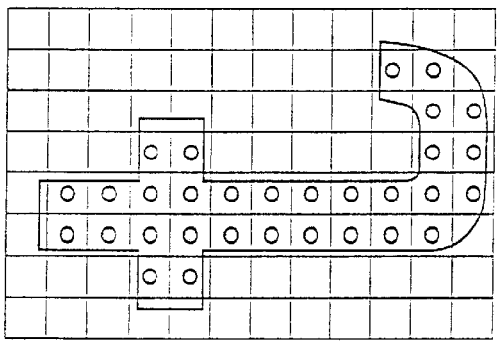
FIG. 4 depicts the manner in which an individual letter is mapped in memory.

The following detailed description includes two distinct portions. The first portion involves receiving and orienting a fax—controlling the top edge to be printed first or the bottom edge to be printed first, no matter which edge was actually received first. FIGS. 1–3 disclose a first embodiment for controlling orientation of the documents, and FIGS. 4–10 disclose a second embodiment for the same purpose. The second portion of the description involves user selection and control—printing all documents top edge first (or all documents bottom edge first), or alternating documents with top edges first, then bottom edges first, etc. This selection circuitry is shown in FIG. 11, and its timing diagram is illustrated in FIGS. 12A–D.

In the system of FIG. 1, character recognition is the basis for determining document orientation. Both transmitting and receiving functions are governed by controller 12, typically a microprocessor. A document to be transmitted is scanned by scanner 10, and controller 12 transmits the data over fax output line 30. The subject embodiment does not concern the transmit mode. (One day, there may be a standard by which the transmitter tells the receiver whether a document is being sent top edge first or bottom edge first, with a receiver then perhaps reorienting documents as appropriate.) The subject embodiment concerns operations in the receive mode, with data incoming over line 32.

Incoming data, or a representation of it, is stored in RAM memory 14. A typical fax machine has sufficient memory available to store a full page. (For example, if the same document is to be transmitted to many other machines, then rather than to scan it repetitively, the data can be stored in memory 14 and read out repetitively.) The data stored in RAM 14 is accessed by character recognition processor 16 through controller 12. Although shown as a separate processor, it is to be understood that the function of block 16 is accomplished by software, just as software governs the operation of controller 12. The character recognition processor determines whether an incoming document arrived top first or bottom first. Once that determination has been made, the controller is informed over line 34. The controller then causes the stored data to be read out of memory 14 by read control circuit 18. A command sent over line 36 controls reading to take place either in the same order in which data was stored, or in the reverse order, as will be described in connection with FIGS. 2 and 3. The data thus read is delivered to printer 20 which prints the document in a conventional manner.

It is thus apparent that the system of FIG. 1 utilizes substantially the same hardware as is found in a present-day facsimile machine except for the addition of some software. The software, typically in the form of read only memory, can be provided at very little additional expense.

FIG. 2 shows a typical document which arrives top edge first. As shown, the document is scanned (at the transmitter which sends data to fax input line 32) from left to right, and top to bottom. Successive scan lines are numbered 1–N, and it is assumed that there are M pixels on each line numbered 1–M from left to right. The incoming data is processed and a representation of it is stored in memory 14 in the order in which it is received.

FIG. 3 shows an "upside down" document, with scanning taking place in the reverse direction. The scan lines are still numbered 1–N, but they now effectively scan the document from bottom to top, and right to left. The two serial data streams which result from the scan sequences of FIGS. 2 and 3 are opposites of each other (first-to-last versus last-to-first) and, as depicted by the letters ABC, provide identical data streams if the two documents have opposite orientations.

Once the data is stored in memory from scanning of the type depicted in FIG. 2, if the data is read out in the same order, then the document will be oriented in the same way it was scanned by the original transmitter. If the top edge was transmitted first, it will be printed first. On the other hand, if the document is read from memory 14 in the reverse order, as shown in FIG. 3, then the last edge received will be printed first. This means that if the bottom edge was transmitted first, the top edge will be printed first. The net result is that all documents can be made to have the same orientation in the output bin of the printer.

Let us assume that a document as shown in FIG. 2 is received over the fax input line 32. In other words, the transmitter sent the top edge first. When the character recognition processor scans the data in memory 14 in the same order and "recognizes" the letters ABC, it knows that by reading out the data in the same order in which it was received, the top edge of the document will be printed first.

On the other hand, suppose that the bottom edge was transmitted first. The data stored in memory 14, if mapped to the document, depicts the characters ABC upside down, as shown in FIG. 3. If the character recognition processor now scans the data in the memory in the reverse order, it will "recognize" the letters ABC and thus determine that the document was transmitted bottom edge first. What this means is that if the data is now read out of the memory in the reverse order, using the scanning sequence shown in FIG. 3, the top edge of the document will actually be printed first.

The question is how does the character recognition software know whether the data stored in the memory represents a document oriented as shown in FIG. 2 or a document oriented as shown in FIG. 3. That is a very simple matter. Using a brute force approach, the software can scan the data in the memory twice, once in the order shown in FIG. 2, and once in the order shown in FIG. 3. In one case characters will be recognized and in the other they won't. In those cases where there are actually some upside down characters on a page, it is simply a question of which scanning process gives rise to more recognizable characters.

It should be apparent, however, that it is really not necessary to scan the data representative of the entire document. It is sufficient to scan a small band. For example, the software may first detect "white" bands between lines of text. Thereafter, the software may scan the same band of text—a single line of characters—in the two directions depicted in FIGS. 2 and 3. One of the scans should result in far more recognizable characters than the other, and this determines the page orientation. In what would be the fastest scheme of all, a band of text could be scanned to recognize periods. Each period, since it is at the bottom of a line of text, is closer to one of the two white bands bounding a line of text than it is to the other. This in and of itself determines the page orientation. (Looking for an isolated dot may be fast, but it is hardly accurate. However, if a mistake is made, the worst that happens is that one page gets printed wrong edge first.)

It might be thought that documents could not be received and printed as fast as they otherwise could with the page reorientation processing. The reason for this is that all of the incoming data is stored in the memory, and then it is read out for printing purposes. Because the printing does not take place simultaneously with the transmission at the other end of the line, there is necessarily a delay. Unless a pair of memories is used, with one being read while the other is being written, while the printer 20 is operating, controller 12 must send a signal to the transmitting machine to tell it to wait before transmitting another document because memory 14 is still in use.

However, this is not the case, and additional memory is not required. As soon as data is read out of any memory location for printing purposes, new data can be stored in that location. Thus the transmitter can immediately transmit another document almost as soon as it finishes transmitting the first. If the character recognition software determines that the data must be read out of memory 14 in the reverse order, as depicted in FIG. 3, then the next document simply has to have its data stored in reverse order—with the first arriving data being stored in memory at a location which maps to the lower right of the documents depicted in FIGS. 2 and 3. Once the data is stored in the memory, the character recognition software does not care whether it was originally stored in the normal or the reverse order. After recognizing a page orientation, it controls read-out of the data using one of the two scanning sequences shown in FIGS. 2 and 3.

FIG. 4 shows the bit map of the letter t as it appears in memory. During the transmission process, each character is in effect applied against a grid of pixels, and any individual pixel is a 1 if more than half of its area is "covered" by part of the letter. (The pixel array might be finer than that depicted in FIG. 4, and the drawing is symbolic only.) What is stored in memory 14 of FIG. 1 is such a bit map for the entire document. It is assumed that the image whose orientation is to be determined consists of text in horizontal, parallel lines. (The method can be extended to vertical scripts such as Japanese or Chinese.) It is further assumed that the image consists of black letters on a white background.

Figure 6:
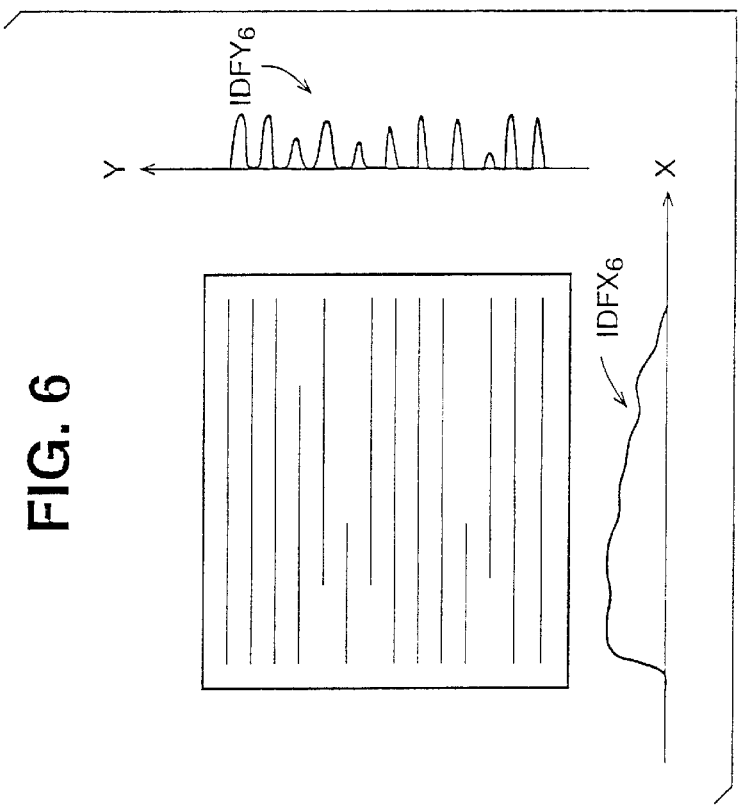
FIGS. 5 and 6 depict two different orientations for the same document, along with their respective X-axis and Y-axis Image Density Functions (IDF)

The first step in the overall method of the second embodiment of the page alignment portion of the present invention is to reorient the image in memory so that the lines of text are horizontal. One reason for doing this is to correct skew of the document as it is represented in memory. In other words, while the received signal may represent a document such as that depicted in FIG. 5, it is desired to reorient the document and print it as shown in FIG. 6. Another reason for reorienting the document image is that the method of the invention for determining the orientation of the document and whether it has to be rotated 180 degrees requires scanning of lines which are parallel with lines of text.

In this regard, reference is made to U.S. Pat. No. 5,191, 438 in the name of Katsurada et al, which patent is entitled "Facsimile Device With Skew Correction And Text Line Direction Detection" and issued on Mar. 2, 1993. This patent pertains to correcting the skew of a document and even an additional rotation by 90 degrees at a facsimile transmitter, rather than at a facsimile receiver. The reason for this is that facsimile transmission is more efficient if there are horizontal lines which are blank, or clear. To maximize the number of successive scan lines through clear areas of the document, skew corrections are made. Similarly, with languages such as Japanese, even though documents may be written in vertical lines, it is more efficient to transmit them after they are rotated by 90 degrees, and for this reason the Katsurada et al system corrects for skew and even makes an additional 90 degree rotation.

The way this is done is to scan along multiple lines and, depending on the results, to "rotate" the document in memory by manipulating all of the bits in accordance with well known mathematical algorithms. The correction for skew in my invention is similar, although it should be understood that the Katsurada et al technique could be used in its place.

Figure 5:
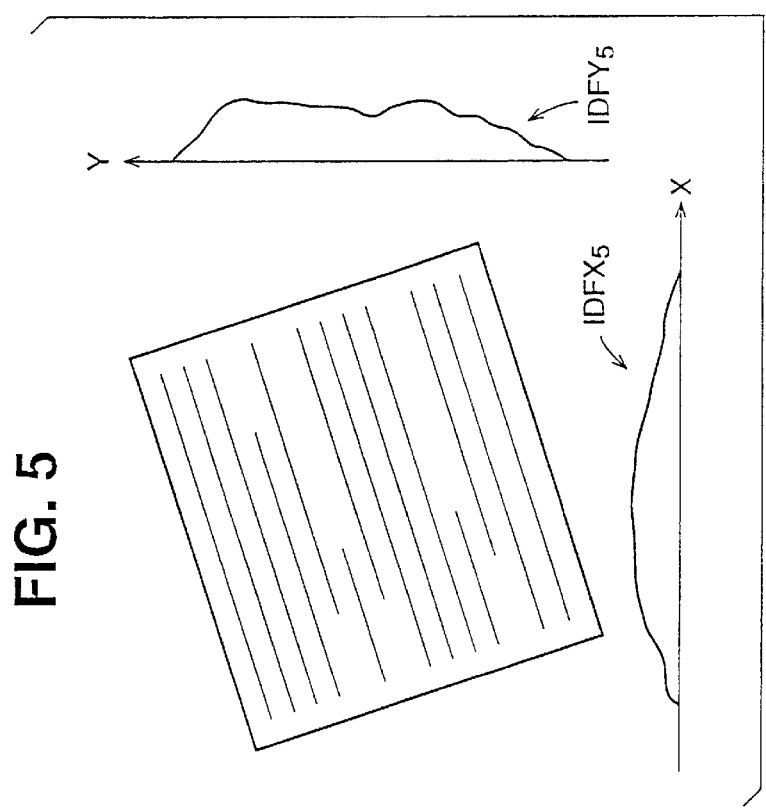

An Information Density Function (IDF) is simply a representation of the average density along horizontal segments of a document, or along vertical segments of a document. Referring to FIG. 5 for example, the Information Density Function along the vertical axis is identified by the letters $IDFY_5$. (The subscript 5 simply refers to the Figure number so that the plots of FIGS. 5 and 6 can be distinguished from each other.) Each value of this function (as measured in the horizontal direction as the distance between the vertical Y axis and the point at which the function itself is intersected) represents the amount of "darkness" along a horizontal line scan through the document. Similarly, the Image Density Function as measured along vertical segments is represented by the curve $IDFX_5$. In the case of a document represented by bit values in memory, there would be as many discrete values for each Image Density Function as there are columns or rows respectively of bits in the memory which represent the image. The function value for each row or column would simply be the number of is contained in that row or column.

The document of FIG. 6 is not skewed as is the document of FIG. 5, and the most notable difference between the two Information Density Functions for this document as compared with those for the document of FIG. 5 is that $IDFY_6$ has numerous peaks, and numerous regions where the Information Density Function is zero. This is because the lines are horizontal. For example, if there are ten scan lines through a line of text (corresponding to ten rows of memory pixels), then there will be ten adjacent values plotted in $IDFY_6$ which are large and give rise to what looks like a peak in the plot. The next ten scan lines might go through a clear band between lines of text, in which case all ten values of $IDFY_6$ would be zero. The plot of FIG. 6 exhibits numerous maxima and minima, as distinguished from that of the plot for FIG. 5, and it is by comparing IDFY functions that a document can be rotated in memory until its text lines are horizontal. The basic approach is to rotate the document (not physically, but by bit manipulation) until the IDFY function exhibits maximum "peakness."

Figure 7:
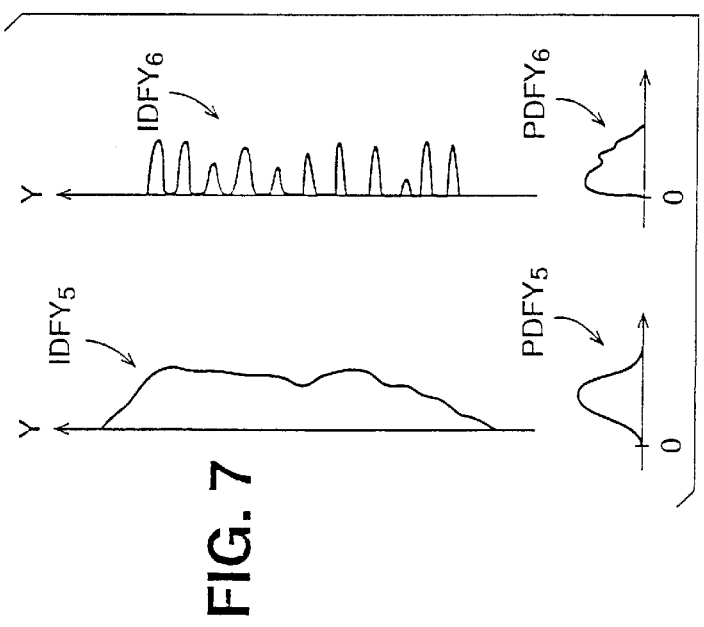
FIG. 7 depicts two Probability Density Functions (PDF) for the two Y-axis Image Density Functions of FIGS. 5 and 6.

The question is how to determine when the document has been rotated so that it has the most clearly defined maxima and minima. One way to do this is shown in FIG. 7.

The two functions $IDFY_5$ and $IDFY_6$ (representing the two orientations of the same document in FIGS. 5 and 6) are plotted side by side, and underneath each there is shown the respective probability density function, $PDFY_5$ or $PDFY_6$. A Probability Density Function is really another Information Density Function. The function $PDFY_5$ is derived by scan lines in the vertical direction through the $IDFY_5$ plot. Similarly, the $PDFY_6$ function is derived by taking scan lines in the vertical direction through the plot $IDFY_6$. The latter plot has numerous segments along the Y axis itself, corresponding to the clear bands between lines of text.

Consequently, the $PDFY_6$ function exhibits a peak at a point corresponding to the Y axis itself. The peak in the $PDFY_5$ function is in a region corresponding to the top (on the right side) of the overall $IDFY_5$ plot. It is thus apparent that as a document is rotated in memory, all that is necessary to determine when the text lines have become horizontal is to determine when the PDFY function is a maximum at the far left of the curve. (In a sense, this is similar to performing a discrete Fourier transform analysis of the IDFY function as the document is rotated in memory, with the image being determined to be horizontal when there is a maximum high frequency content.)

Figure 9:
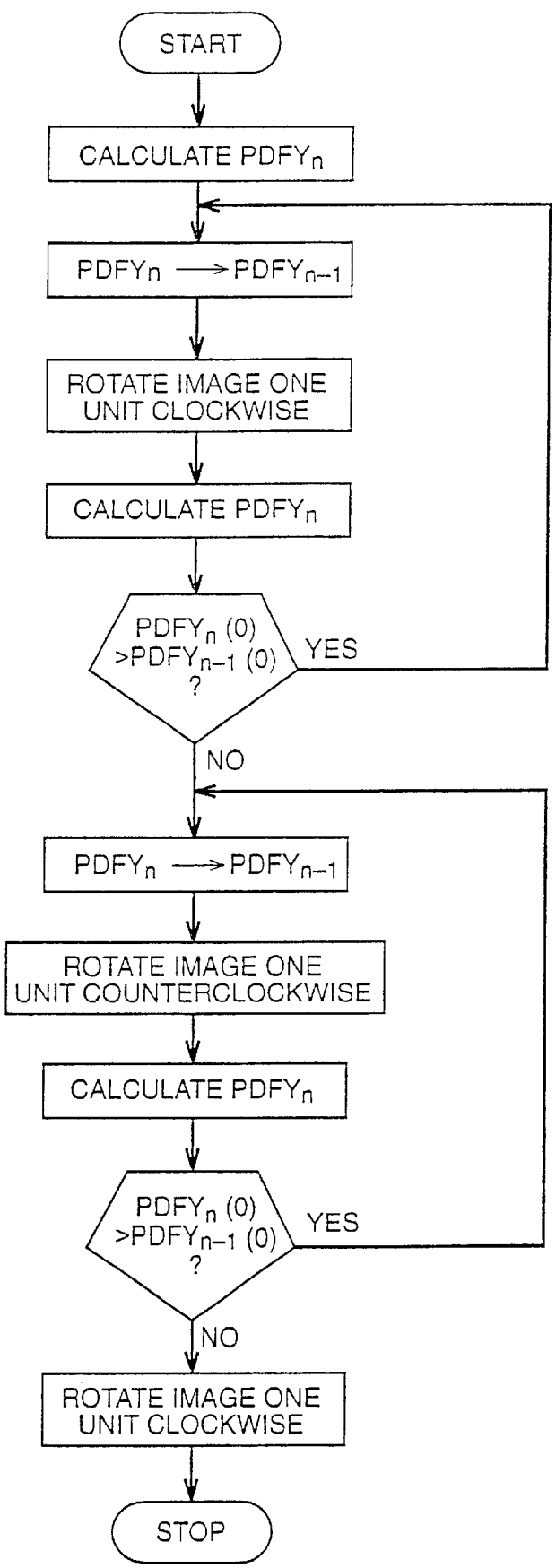
FIG. 9 is a flow chart which depicts optional preliminary processing in an illustrative embodiment of the invention, namely, the way in which the orientation of a document in memory is adjusted so that the lines of text are made horizontal.

The flow chart of FIG. 9 depicts the steps for rotating the document until the PDFY function is maximally skewed to the left (as depicted by $PDFY_6$), that is, until the leftmost value of PDFY is a maximum.

Referring to FIG. 9, the PDFY for the document stored in memory is calculated. This is represented by the symbol $PDFY_n$, where the subscript represents the current calculation. The current value of PDFY is then stored in a memory location which represents the previous value, $PDFY_{n-1}$. The reason for doing this is so that a new PDFY value can be calculated, represented by $PDFY_n$, so that the two of them can be compared. To do this, the image in memory is rotated one unit clockwise, for example, by using the same mathematical manipulations used in the above-identified Katsurada et al patent. After the $PDFY_n$ value for this new image position is calculated, the leftmost value of the function (represented by (0)) is compared with the leftmost value for the previous PDFY function. If the new leftmost value is larger, it is an indication that the rotation is moving in the direction which is increasing the "peakness" of the Image Density Function, i.e., it is sharpening the leftmost transition in the $PDFY_6$ function shown in FIG. 7. Accordingly, the program loops back, treats the new PDFY as the old one, calculates the new one after rotating the image an additional unit in the clockwise direction, and once again compares the two leftmost values. Eventually, $PDFY_{n-1}(0)$ will be greater than $PDFY_n(0)$.

When this happens, as a result of PDFY(0) values having increased as the image was rotated in the clockwise direction, but then having decreased after the last rotation, it means that the document was rotated one unit too far. What is now required is to rotate the image one unit in the counterclockwise direction because the previous image position was the one which had the most "perfect" horizontal lines.

It is also possible that the very first rotation in the clockwise direction is in the wrong direction, i.e., it makes the skew worse. In such a case, the very first inequality test results in an answer of "no" and the execution of the steps in the bottom half of FIG. 9. In this case, there may be several counterclockwise rotations which are necessary until the maximum PDFY(0) value is achieved.

Consider first the case in which successive clockwise rotations produced increasing PDFY(0) values during successive loops around the upper half of the flow chart of FIG. 9. When the first "no" answer results, the processing in the bottom half of the flow chart begins. The processing here is very similar to that in the upper half except that the image rotation is in the opposite direction. The very first rotation in the counterclockwise direction will now return the document to its previous position with a maximum PDFY(0). Consequently, the inequality test is answered "yes". No more looping is necessary, but in order to use the same software for all cases, a loop is taken back where one more counterclockwise rotation takes place. This time the inequality is answered "no" and the processing has concluded. Because of the additional counterclockwise rotation made at the end of the testing, which actually increased the skew, the last step of the processing is to rotate the image one unit in the clockwise direction so that the final orientation of the document is that with maximally horizontal text lines.

Consider now the case in which the first attempt at clockwise rotation results in degradation of the peakness of the IDFY function. After the first inequality test is answered "no", an entry is made into the loop in the bottom half of the flow chart. This time, counterclockwise rotations take place, and presumably the PDFY(0) value keeps increasing, with each increase causing a loop back and the rotation in the counterclockwise direction by one more unit. Eventually, the bottom inequality in FIG. 9 is answered in the negative. This only happens after the last counterclockwise rotation has caused a decrease to take place in the PDFY(0) value. In order to return the document to the orientation with maximally horizontal text lines, the last step in the processing is to rotate the image one unit in the clockwise direction. (For a document which initially is aligned correctly, the upper loop causes one clockwise rotation, the bottom loop causes two counterclockwise rotations, and the last step restores everything with a clockwise rotation.)

All of this pre-processing is designed to obtain in the memory a representation of a document with maximally horizontal lines. An object of the invention, however, is to determine whether the document has to be rotated 180 degrees, and that has not yet been accomplished. This is done by the method depicted in FIG. 10. But before considering how this is done, reference should be made to FIG. 8 which depicts several letters.

Figure 8:
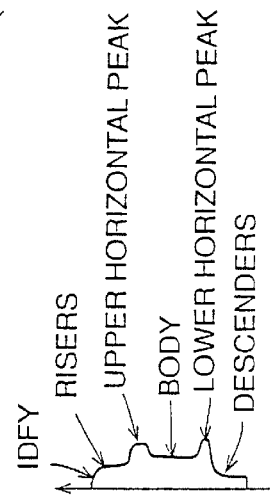
FIG. 8 depicts several letters which illustrate why Image Density Functions differ for line scans through the top and bottom regions of a line of text.

If scan lines are taken through the letters of FIG. 8 and an IDFY function is formed, the function can be divided into five regions. The risers section represents the densities along scan lines at the top of a line of text. These line scans intersect the tops of letters such as t, h, d and l, and the dots at the top of an i or a j. Similarly, the descenders part of IDFY represents line intersections through descenders such as those associated with the letters g and j.

The upper horizontal peak of the IDFY function corresponds to scan lines through the tops of letters such as e, o, m and r. Similarly, the lower horizontal peak corresponds to scan lines through the bottoms of letters such as s, d and b. Finally, the body of the IDFY function corresponds to scan lines through the central section of the line of text.

Because there are more risers than descenders, it is expected that the IDFY function associated with any line of text will have a greater area under the risers portion of the IDFY function than under the descenders portion. Thus in order to determine whether a line of text, and therefore the overall document, is represented right side up or upside down in memory, all that is necessary is to compare the area under the risers portion with the area under the descenders portion. If the former is larger, the document is oriented correctly. If the opposite is true, then the document has to be rotated 180 degrees (by reading the pixel information in reverse order, as discussed above).

Figure 10:
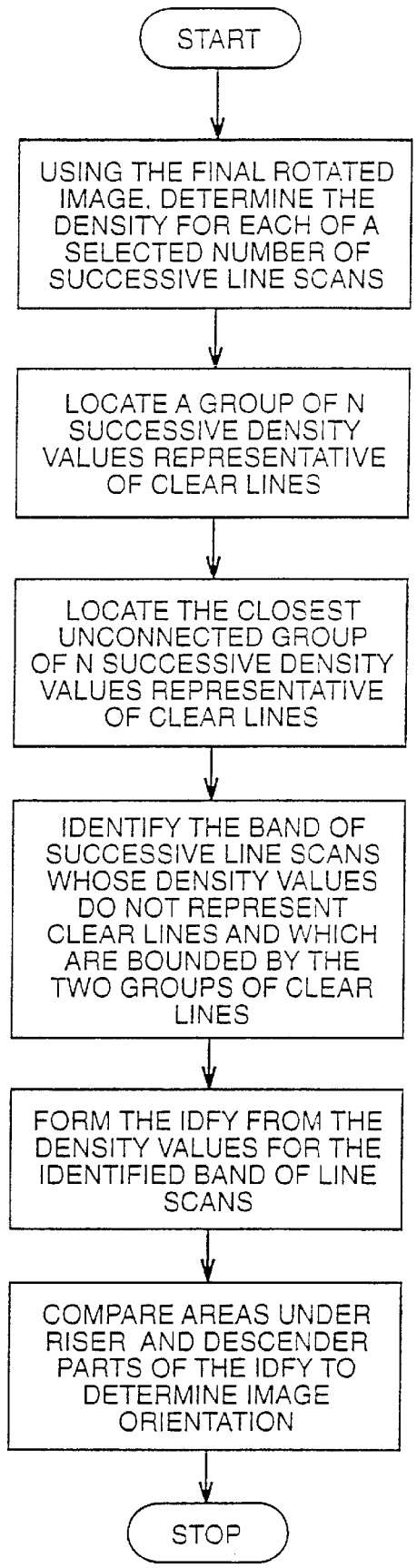
FIG. 10 is a flow chart depicting the processing in accordance with an illustrative embodiment of the subject invention by which the orientation of a document is determined without requiring the recognition of individual characters.
Figure 11:
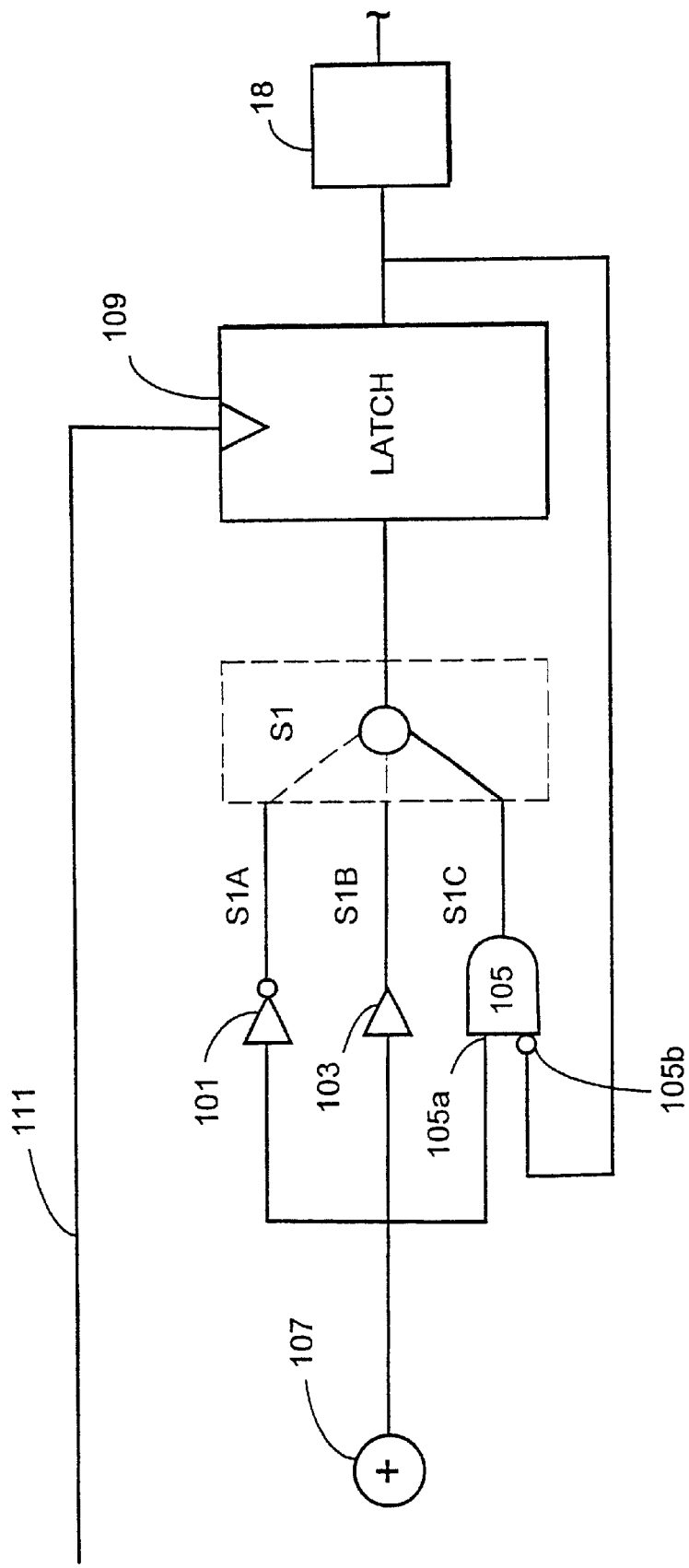
FIG. 11 is a schematic representation of the selective switching circuitry of the present invention.

The flow chart of FIG. 10 depicts the processing. Using the final rotated image, the system first determines the density for each of a selected number of successive line scans, for example, a number of lines corresponding to pixels in all of the rows required to represent two lines of text and two clear bands. From these density values, N successive values representative of a clear band are located. (N must be less than the number of scan lines through a clear band.)

After locating a clear band on the image, the system, in the third step, looks for the closest clear band. The reason it does so is that the non-clear band between the two clear bands most likely represents a line of text. As indicated in the flow chart, the closest group of N successive density values which are representative of clear lines should not be connected with the first group. That is the only way in which the system can be certain that it has isolated a line of text.

All of this is represented in the fourth step of FIG. 10. Once the two groups of clear lines are located, the system has identified the band of successive line scans between these two groups, the density values for which correspond to the IDFY curve for FIG. 8 (the fifth step). In the last step, the areas under the risers and descenders parts of the IDFY function are compared in order to determine the image orientation.

The actual processing of FIG. 10 is straightforward, and is most conveniently implemented under microprocessor control. Once horizontal lines of text are bit mapped in the memory, the processing is relatively simple. The basic steps involve looking at the average densities of scan lines through the top region of a text line and the bottom region of a text line. Whichever group of line scans have an overall higher average density is the group of scan lines associated with the upper edge of the characters. That is all the system must know in order to determine how the page should be printed.

Referring specifically to FIG. 11, the second portion of the present invention is disclosed. Switch S1 can assume three positions. The switch is used for controlling all pages to be printed top edge first (position S1A), all pages to be printed bottom edge first (S1B), or all pages of a first document to be printed top edge first, all pages of a second document to be printed bottom edge first, all pages of a third document to be printed top edge first, etc. (position S1C). The operation of this feature is described with reference to FIGS. 11 and 12A–12D.

Controller 12 in FIG. 1 is responsible for extending control signals to read control 18 in order to print documents. FIG. 11 depicts the document orientation preference switch, and the circuitry of FIG. 11 would be located on lead 36 between controller 12 and read control 18. Alternatively, the circuitry could be incorporated within controller 12. The control signal in FIG. 12A, which appears on line 111 in FIG. 11 (internal to the controller) goes high each time new document data is received on fax input line 32. Only a single pulse is generated at the start of a new document transmission, no matter how many pages are included in the document.

With particular reference to FIGS. 11 and 12, switch S1 can be connected to three inputs. Input S1A is derived from inverter 101, input S1B is derived from buffer amplifier 103, and input S1C is derived from the output of AND gate 105.

When switch S1 is in position S1A, potential source 107 is applied to the input of inverter 101. The low signal at the output of inverter 101 is passed through switch S1 and provides a low signal to latch 109. As long as switch S1 remains in position S1A, control pulses 150a–150e on line 111 (see FIG. 12) maintain the latch output low. A low signal provided to read control 18 indicates that the present page being processed should be delivered top edge first.

When the switch is in position S1B, potential source 107 is extended through buffer amplifier 103 and switch S1 to provide a high signal to latch 109. Accordingly, although latch 109 is clocked upon receipt of each new document, the latch provides a continuous high output to read control 18. In the exemplary embodiment, the high output to read control 18 indicates that the page being processed should be printed bottom edge first.

When the switch S1 is in position S1C, potential source 107 is extended to input 105a of AND gate 105. The AND gate has a second (inverting) input 105b connected to the output of latch 109. If the output of the latch is initially high, then the previous document was printed bottom edge first. The high output of the latch holds the output of AND gate 105 low. Therefore, the next time the latch is clocked, the latch output goes low. Accordingly, the next document is delivered top edge first. The output of gate 105 is now high so the next clock causes the latch output to go high.

FIG. 12A depicts five clock pulses 150a–e, each of which represents a new document receipt. FIG. 12B depicts the low output state of the latch when the switch is in position S1A, and FIG. 12C depicts that a high is always output when switch S1 is in position S1B. FIG. 12D shows that when the switch is in position S1C, the leading edge of each clock pulse (new document receipt) causes the latch output to switch.

The user can thus choose whether all documents will be delivered top edges first, bottom edges first or alternating documents top and bottom edges first. The potential extended to read control 18 indicates which edge is to be printed first. The read control analyzes the data orientation in memory and controls the appropriate read-out under command of controller 12.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A facsimile machine for printing received documents in selected alignments, documents being received by the machine with random orientations, comprising a memory, means for storing in said memory data representative of a received document, means for processing said stored data to determine whether the document represented by said data had its top or bottom edge transmitted first, means for printing a document represented in said memory, means for selecting whether successive multi-page documents are to have the same or opposite orientations relative to each other, and means for controlling said printing means in accordance with said processing means and said selecting means.

2. A facsimile system for controlling successive printed documents to have the same or opposite orientations comprising means for printing a document in accordance with received data, said received data representing documents having random orientations, means for processing said received data to determine the order in which said data is used by said printing means so that a document is printed with a known orientation, and means for selecting between the same and alternating orientations of successive printed multi-page documents.

3. A facsimile receiving apparatus comprising means for receiving facsimile messages having random orientations, means for printing each received facsimile message, and means for selecting a document delivery format which has like edges of successive multi-page documents aligned similarly or alternately.

4. A method for operating a facsimile system comprising the steps of receiving data, said received data representing documents having random orientations, processing said data to determine the order in which said data is received, selecting a document orientation preference scheme, and printing successive documents in accordance with said selected orientation preference scheme so that successive multi-page documents have the same or opposite orientations relative to each other.

5. The method of claim 4, wherein said document orientation preference scheme can be all like edges aligned, or successive documents having alternately oriented like edges.

6. A method for operating a facsimile system comprising the steps of printing a document in accordance with received data, and processing said data to determine the order in which said data is used in the printing step, so that successive documents are printed in a predetermined relationship.

\* \* \* \* \*